United States Patent
Pathak et al.

(10) Patent No.: US 8,521,634 B1
(45) Date of Patent: Aug. 27, 2013

(54) SYSTEM AND METHOD FOR RECONCILING FINANCIAL RECORDS BY MATCHING OUTSTANDING TRADE ORDERS TO UNMATCHED TRANSACTIONS

(75) Inventors: Heeren H Pathak, Woburn, MA (US); John Artz, Woburn, MA (US); Jay Goldman, Wellesley, MA (US); Yashodhan Sathaye, Acton, MA (US); Scott Souliotis, Amesbury, MA (US); Annmarie Rogers, Haverhill, MA (US); Dennis Sheckler, Cambridge, MA (US); Ladislav Kis, North Andover, MA (US)

(73) Assignee: Vestmark, Inc., Wakefield, MA (US)

( * ) Notice: Subject to any disclaimer, the term of this patent is extended or adjusted under 35 U.S.C. 154(b) by 0 days.

(21) Appl. No.: 13/457,676

(22) Filed: Apr. 27, 2012

Related U.S. Application Data

(62) Division of application No. 12/057,707, filed on Mar. 28, 2008, now Pat. No. 8,175,943.

(60) Provisional application No. 60/920,990, filed on Mar. 30, 2007.

(51) Int. Cl.
*G06Q 40/00* (2012.01)

(52) U.S. Cl.
USPC .................. 705/36 R; 705/4; 705/30; 705/33; 705/35; 705/37; 705/38; 705/40; 714/49; 235/431

(58) Field of Classification Search
USPC ..... 705/35–38, 30, 40, 36 R, 4, 33; 235/431; 714/49
See application file for complete search history.

(56) References Cited

U.S. PATENT DOCUMENTS

| | | | |
|---|---|---|---|
| 2,979,257 A * | 4/1961 | Jancin, Jr. | 235/431 |
| 5,497,317 A * | 3/1996 | Hawkins et al. | 705/37 |
| 7,089,206 B2 | 8/2006 | Martin | |
| 7,120,597 B1 | 10/2006 | Knudtzon et al. | |
| 7,451,103 B1 | 11/2008 | Boyle | |
| 7,567,935 B2 | 7/2009 | Tell | |
| 7,685,030 B1 | 3/2010 | Lowry et al. | |
| 7,693,778 B2 * | 4/2010 | Nafeh | 705/37 |
| 7,761,364 B2 * | 7/2010 | Wunsch et al. | 705/37 |
| 7,774,246 B1 * | 8/2010 | Keith | 705/35 |
| 7,783,560 B2 * | 8/2010 | Hirani et al. | 705/37 |
| 2001/0047279 A1 | 11/2001 | Gargone | |
| 2003/0050879 A1 | 3/2003 | Rosen | |
| 2004/0210511 A1 * | 10/2004 | Waelbroeck et al. | 705/37 |
| 2005/0187852 A1 | 8/2005 | Hwang | |
| 2006/0129896 A1 | 6/2006 | Rohn | |
| 2008/0140547 A1 | 6/2008 | Murphy et al. | |

OTHER PUBLICATIONS

Steve Hawkes—"ING parachutes new top team into broker"; Evening Standard. London (UK): May 10, 2005. p. 31.*
Reuter—"Comex Ending Short Sessions; [Sports Final, CEdition]"; Reuters. Chicago Tribune (pre-1997 Fulltext). Chicago, Ill.: May 7, 1987. p. 6.*

* cited by examiner

*Primary Examiner* — Harish T Dass
(74) *Attorney, Agent, or Firm* — Swanson & Bratschun, L.L.C.

(57) ABSTRACT

A system and method for financial account reconciliation of a portfolio account system includes, for investments that are not reported as trades once an order to purchase has been placed, using a computer to electrically match investments that are not reported as trades to unmatched transactions of the portfolio account system. In this manner investments that are not reported as trades once an order to purchase has been placed do not create breaks of the portfolio account system.

12 Claims, 2 Drawing Sheets

| | Detect Breaks | Auto Close Tolerances | | Allow Trading Tolerances | | |
|---|---|---|---|---|---|---|
| | | Amount | Percent | Always | Amount | Percent |
| Quantity | ☑ | | | ☐ | 0.9900 | 8.000 |
| Cost Basis | ☐ | | | ☐ | | |
| Market Value | ☐ | | | ☐ | | |
| Original Face Value | ☐ | | | ☐ | | 2.500 |
| Current Face Value | ☐ | | | ☐ | | 2.500 |
| CashTotal | ☑ | 50.0000 | | ☐ | 1000.000 | 10.000 |
| Cash Allocation | ☐ | | | ☐ | | |
| External Id | ☐ | | | ☐ | | |

Figure 1

Correction Rules | Routing Rules

| Tran. Type | Tran. Field | Always Accept | Accept Within Tolerance (% and $) | | Accept If IM Stars | Disable |
|---|---|---|---|---|---|---|
| Buy | amount | ○ | ● 5.000 | and 1.01000 | ○ | ○ |
| Buy | settleDate | ○ | ○ 0 | and 0 | ○ | ● |
| Buy | faceValue | ○ | ○ 0 | and 0 | ○ | ● |
| Buy | commission | ○ | ● 5.000 | and 1.01000 | ○ | ○ |
| Buy | accruedInterest | ○ | ○ 0 | and 0 | ○ | ● |
| Buy | externalId | ● | ○ 0 | and 0 | ○ | ○ |
| Sell Long | amount | ○ | ● 5.000 | and 1.01000 | ○ | ○ |
| Sell Long | settleDate | ○ | ○ 0 | and 0 | ○ | ● |

SYSTEM AND METHOD FOR RECONCILING FINANCIAL RECORDS BY MATCHING OUTSTANDING TRADE ORDERS TO UNMATCHED TRANSACTIONS

RELATED APPLICATIONS

This application is a divisional of U.S. application Ser. No. 12/057,707 filed Mar. 28, 2008, entitled "System and Method for Reconciling Financial Records," which claims the benefit of U.S. Provisional Patent Application Ser. No. 60/920,990, filed Mar. 30, 2007, entitled "System and Method for Reconciling Financial Records," each of which are hereby incorporated by reference in their entirety.

TECHNICAL FIELD

The invention relates to a system and method for reconciling financial records.

BACKGROUND

Financial institutions must ensure that the customer records they use to make decisions are correct. There are often several separate entities involved in making financial decisions. In an example scenario, one company might manage the customer's account; another might make investment decisions; and a third will actually buy and sell the securities on behalf of the investor. When multiple parties are involved, one party is designated as custodian of the information. The custodian is said to be keeping the "book of record." This custodian company is the source of the truth about what securities the investor holds. Often this custodian company is a sponsor firm with which investors have accounts.

Each other company who needs to make decisions based on the customer's holdings needs to be sure that they have accurate information. They must periodically compare the information they have with the custodian's information to identify and correct any differences. This process is called reconciliation and is a key challenge facing financial institutions. The company who is performing the reconciliation can be referred to as the shadow company because they are keeping a shadow copy of the information that the custodian makes available. The information from the custodian can be provided in a variety of formats, including for example web pages, text files, spreadsheet files, fax printouts, on screen through a legacy terminal system, and the like. This information is often compared manually and any differences that are identified must be manually entered into the shadow accounting system.

Reconciliation must be done quickly and accurately. The information from the custodian systems is usually available in the early hours of the morning and must be reconciled before any decisions or trades can be made. This process requires identification of any differences, correction of any problems, and tracking of the process so that the status of individual accounts is known. This is a costly and error prone process for many institutions today.

There are two types of information that can be compared during reconciliation: positions and transactions. Positions (also called holdings) are simply the list of securities that each account holds; transactions capture all activity that occurs. If the proper set of positions are available at a point in time and all of the transactions are applied that the custodian has applied, then the positions should match the custodian's positions. When performing reconciliation, many companies perform only position reconciliation to ensure that they have the same holdings as the custodian. They do this because the cost in time and dollars of doing the transaction reconciliation is too great.

What would therefore be desirable would be a system for performing reconciliation that streamlines the reconciliation process. It would be desirable for a system for performing reconciliation to allow the user to define rules to ensure that the differences detected (also called breaks) and presented to the user are the most important breaks. It would be further desirable for a system for performing reconciliation to allow a manager to specify that certain types of transaction differences should be automatically corrected. It would be further desirable for a system for performing reconciliation to allow the reconciliation user to accept values from the custodian system automatically into the shadow system. It would be further desirable for a system for performing reconciliation to enable the matching of outstanding trade orders to unmatched transactions in the reconciliation system. It would be further desirable for a system for performing reconciliation to enable comparison of backdated custodian transactions. It would be further desirable for a system for performing reconciliation to enable proper matching of positions and transactions that have not yet settled.

The system for performing reconciliation described and claimed herein may perform one or more of the tasks set forth above.

SUMMARY

A system and method for reconciling financial records is provided. In one aspect, breaks, which are differences between shadow accounts and custodial accounts, are screened by user defined rules to categorize breaks into categories of relatively higher and relatively lower importance so that relatively higher importance breaks can be presented to the user. Values from a custodian system can be to be automatically accepted.

Another aspect of the system for performing reconciliation streamlines the reconciliation process by allowing the user to define rules to ensure that the differences detected (also called breaks) and presented to the user are the most important breaks. Breaks of low importance to the shadow company can be automatically closed, or simply marked such that these breaks do not prevent the account from being traded. This ensures that minor differences do not use up the reconciliation resources. The reconciliation user may specify tolerances to indicate which breaks should be automatically closed and which breaks should not prevent trading.

Another aspect of the system for performing reconciliation allows a manager to specify that certain types of transaction differences should be automatically corrected. Transactions that only the custodian has can be automatically posted to the shadow system. These automatic adjustments take care of many of the obvious differences and allow the reconciliation to focus on the important differences. The reconciliation user may specify tolerances to designate which transactions differences should be automatically corrected or posted.

Another aspect of the system for performing reconciliation allows the reconciliation user to accept values from the custodian system automatically into the shadow system. Instead of first identifying the differences, and then having to manually update the shadow accounting system, this aspect of the reconciliation system allows the user to accept the custodian values directly into their system. This both saves time and helps prevent human errors from entering the reconciliation process.

Another aspect of the system for performing reconciliation enables the matching of outstanding trade orders to unmatched transactions in the reconciliation system. There are certain types of investments that are not reported as trades once the order to purchase has been placed. An example would be mutual funds which are priced at the end of the day. This aspect of the reconciliation system will automatically detect that the order has been fulfilled by an unpaired transaction, and will close the order and automatically ignore the unpaired transaction.

Another aspect of the system for performing reconciliation enables comparison of backdated custodian transactions. The custodian may occasionally send an update to an older transaction. Rather than being required to manually find the corresponding transaction, historical transactions may be automatically loaded from the shadow system and compared to the back-dated transaction.

Another aspect of the system for performing reconciliation enables proper matching of positions and transactions that have not yet settled. Certain types of investments have information that will not be known until they settle. This poses issues for reconciliation because the unknown information cannot be compared properly. This aspect of the reconciliation system provides a method for identifying and ignoring the position and transaction breaks this unknown information causes. The unknown information will often result in a difference in cash amounts. This aspect of the reconciliation system allows for the automatic adjustment of the cash values to handle the unknown information.

BRIEF DESCRIPTION OF THE DRAWINGS

FIG. 1 is a sample user interface that allows the user to specify the break detection, auto close tolerances, and the allow trading tolerances in accordance with the principles of the present invention.

FIG. 2 is an example of a user interface for specifying auto-posting rules in accordance with the principles of the present invention.

FIG. 3 is an example of a user interface for specifying auto-correction rules in accordance with the principles of the present invention.

DETAILED DESCRIPTION OF THE INVENTION

Break Detection and Tolerances

As previously introduced, one aspect of a system for performing reconciliation allows the user to define rules to ensure that the breaks presented to the user are the most important breaks. Some types of breaks are more important than other types of breaks. Examples of the various types of position and transaction breaks are outlined in Table 1 and Table 2, below:

TABLE 1

Position Break Types

| Break Type | Description |
| --- | --- |
| Unpaired Position | The sponsor or shadow system has a position that is not present in the other system |
| Quantity | The number of shares held is different. |
| Original Face Value | The original face value of the holdings is different |
| Current Face Value | The current face value of the holdings is different |
| Cost Basis | The cost basis of the holdings is different |
| Market Value | The market value is different |

TABLE 1-continued

Position Break Types

| Break Type | Description |
| --- | --- |
| Cash Total | The amount of cash is different |
| Cash Allocation | The cash is distributed among cash equivalent securities differently. (actual cash, money markets etc) |
| External ID | The external position id is different |

TABLE 2

Transaction Break Types

| Break Type | Description |
| --- | --- |
| Unpaired Transaction | The sponsor or shadow system has a transaction that is not present in the other system |
| Quantity | The number of shares on the transactions is different |
| Original Face Value | The original face value on the transactions is different |
| Current Face Value | The current face value on the transactions is different |
| Amount | The amount on the transactions is different |
| Settle Date | The settle date is different |
| Accrued Interest | The accrued interest is different |
| SEC Fee | The sec fee is different |
| Commission | The commission is different |
| External Id | The external transaction id is different |

The different types of breaks do not all have equal importance. For example, a position quantity or cash total break is more important than a cost basis or market value break. The user can specify which types of breaks they wish to detect. For each break type, the user can indicate if they want to detect that type of break or not. In addition to deciding to detect breaks, the user can indicate if they want these breaks to keep the account from trading or not. When a break is detected, it usually prevents the account from being traded until the break is resolved. By indicating that that type of break should not prevent trading, all breaks of that type will allow the account to trade.

Even within a single break type the magnitude of the break contributes to the importance of the break. For example, a cash break of $10,000 would be of greater importance than a cash break of $1. The user can define tolerances to keep small breaks from excluding their accounts from trading. The user might specify, for example, a dollar amount under which the break should not prevent the account from trading. Additionally, the user might specify a percentage difference that would not prevent the account from trading. Table 3 outlines a few sample accounts with their cash values that will be used to illustrate how the tolerance rules can be applied:

TABLE 3

Sample Accounts and Values

| Account | Sponsor Value | Shadow Value |
| --- | --- | --- |
| A | $1,000 | $999 |
| B | $1,000 | $900 |
| C | $500 | $400 |

For example, if the tolerance was $10, then Account A would be allowed to trade but B and C would be prevented; if the tolerance was 10%, then Accounts A and B would be able to trade but C would be prevented. A user can specify both a percentage and a dollar amount. If this is done, the difference must be within both tolerances. If the tolerance was $100 and 10%, then Accounts A and B would be able to trade but C would be prevented because $100 is more than 10% of $400.

Sometimes breaks might be so small that the breaks are just noise that needs to be filtered out. In this case, the user can choose to have the break be automatically closed. This will keep the break from preventing trading and also exclude the break from the default display of the list of breaks. The breaks are identified and then automatically closed. This is done to track that the break existed and was deemed unimportant. The user is able to view these breaks if they change their filter settings on the user interface to include them. FIG. 1 sets forth a sample user interface that allows the user to specify the break detection, auto close tolerances and the allow trading tolerances.

Accept Sponsor Values

As previously summarized, another aspect of a system for performing reconciliation allows the reconciliation user to accept values from the custodian system automatically into the shadow system. When reconciling transactions there are many different fields to compare. For a single transaction comparison, each difference will create a separate break. So for a single transaction there can be several transactions. For example, the following example transactions set forth in Table 4 are compared:

TABLE 4

Example Transactions

| Field | Sponsor Value | Shadow Value |
|---|---|---|
| Quantity | 100 | 100 |
| Amount | $1,497.63 | $1,500.00 |
| SEC Fee | $2.37 | $0 |

Two transaction breaks would be created—an amount break and a Securities and Exchange Commission (SEC) fee break. During transaction reconciliation, thousands of transactions can be compared. This can result in a significant number of transaction breaks being created.

In order to quickly and accurately correct breaks, the user is able to accept the value from the custodian and the shadow system will be updated. The user selects a break or a list of breaks and chooses to accept the custodian values. The user then selects the types of corrections to be applied, which ensures that only the intended changes are applied even if a large set of breaks is selected. Examples of the types of corrections that can be applied are outlined in Table 5, below:

TABLE 5

Accept Values Choices

| Correction Type | Description |
|---|---|
| Unpaired Transaction | Posts the sponsor transactions |
| Quantity | Corrects the quantity breaks |
| Amount | Corrects the amount breaks |
| Face Value | Corrects the face value break |
| Accrued Interest | Corrects the accrued interest breaks |
| SEC Fee | Corrects the SEC fee breaks |
| Commission | Corrects the commission breaks |
| External Id | Corrects the external id breaks |
| Settle Date | Corrects the settle date breaks |
| Cancel Correct | Cancels the current transaction and replaces it with a corrected version. |

After the user selects the set of breaks and the types of corrections to apply, the shadow system is updated with the new values. Each break is corrected independently and the results of the correction are recorded and reported to the user. Once the selected breaks have been corrected, a report is provided to the user indicating how many breaks were successfully corrected, how many breaks had some sort of error, and how many breaks had no corrections to be made. If the user selects a quantity break and chooses to correct amount differences, no correction will be applied and the user will be notified that the break had no corrections to be made.

Transaction Auto-Correction and Auto-Posting

As previously summarized, another aspect of a system for performing reconciliation allows a manager to specify that certain types of transaction differences should be automatically corrected. While some prior art systems take in a transaction feed from the custodian and allow the automatic posting of those transactions, these transactions are blindly posted, whether or not the transaction exists in the shadow system. Also, prior art systems only handle simple transactions and do not support auto-posting of back-dated cancels and cancel-corrects.

This aspect of the system for performing reconciliation evaluates the transaction to see if there is a matching transaction and creates an "unpaired transaction" break. For certain transaction types, the auto-post is performed on the event of an "unpaired transaction" break. This approach intelligently decides whether the transaction needs to be posted before auto-posting it. This aspect of the system for performing reconciliation allows for transaction reconciliation to be rerun without harming the system and ensures that transactions are not double posted.

While providing an improvement over manually entering the changes into the shadow system, accepting custodian values still requires user action. Once the user has identified frequent breaks which will be corrected, the user can define rules to have these breaks automatically corrected without user intervention.

Major types of rules that govern automatic actions include: auto-posting and auto-correction. When the custodian has a transaction that the shadow system does not have, that transaction can be automatically posted if the proper rule is defined. This auto-post is done in the same manner as accepting values on an unpaired transaction break, except that it is done automatically. When there are differences in the various fields, the custodian values can be taken if the proper rule is configured. This auto-correction works the same way as accepting values on a transaction break.

The user should be able to control at a detailed level what will be posted and corrected. In one embodiment of the invention, the user can define which transaction types should be automatically posted and whether or not cancels of that transaction type should also be automatically posted. Further, more detailed rules can be defined including but not limited to tolerance rules based on amount, percentage of total account value, number of transactions posted to a single account, security or investment types, and other transaction or account attributes.

For basic transaction types, the following can be determined, for example: if transactions of this type should be posted automatically; if cancel transactions of this type should be posted automatically; what the tax-lot selection rule should be. Available transaction types can include, for example: add long, deliver long, contribution, withdrawal, income, expense, management fee, cash dividend, coupon, split, mature long, call long, put long, redeem long, increase principal long, pay principal long, return of capital long, and reduction of basis long. FIG. 2 is one example of a user interface for specifying auto-posting rules.

In addition to the rules for what transactions should be posted, rules can be defined to control what fields should be corrected. The first aspect of the auto-correction rule is to identify which transaction type and field should be auto-corrected. Table 6 contains a list of transaction types and the fields that make sense to be corrected on those transaction types:

TABLE 6

Transaction Type & Field

| Transaction Type | Available Transaction Fields for this Transaction Type |
|---|---|
| Buy | Amount |
| | Settlement Date |
| | Face Value |
| | Commission |
| | Accrued Interest |
| | External Id |
| Sell Long | Amount |
| | Settlement Date |
| | Face Value |
| | SEC Fee |
| | Commission |
| | Accrued Interest |
| | External Id |
| Deliver Long | Commission |
| | Accrued Interest |
| | External Id |
| Contribution | Amount |
| | Settlement Date |
| | External Id |
| Withdrawal | Amount |
| | Settlement Date |
| | External Id |
| Income | Amount |
| | Settlement Date |
| | External Id |
| Expense | Amount |
| | Settlement Date |
| | External Id |
| Management Fee | Amount |
| | Settlement Date |
| | External Id |
| Cash Dividend | Amount |
| | Settlement Date |
| | External Id |
| Coupon | Amount |
| | Settlement Date |
| | External Id |
| Split | Amount |
| | Settlement Date |
| | External Id |
| Mature Long | Amount |
| | Settlement Date |
| | Face Value |
| | SEC Fee |
| | Commission |
| | Accrued Interest |
| | External Id |
| Call Long | Amount |
| | Settlement Date |
| | Face Value |
| | SEC Fee |
| | Commission |
| | Accrued Interest |
| | External Id |
| Put Long | Amount |
| | Settlement Date |
| | Face Value |
| | SEC Fee |
| | Commission |
| | Accrued Interest |
| | External Id |
| Redeem Long | Amount |
| | Settlement Date |
| | Face Value |

TABLE 6-continued

Transaction Type & Field

| Transaction Type | Available Transaction Fields for this Transaction Type |
|---|---|
| | SEC Fee |
| | Commission |
| | Accrued Interest |
| | External Id |
| Increase Principal Long | Amount |
| | Settlement Date |
| | External Id |
| Pay Principal Long | Amount |
| | Settlement Date |
| | External Id |
| Return of Capital Long | Amount |
| | Settlement Date |
| | External Id |
| Reduction of Basis Long | Amount |
| | Settlement Date |
| | External Id |

For each of these various transaction types and fields, the user can define the automatic correction rules to indicate what should be taken. Several examples of the possible rules are outlined here, though not all possible rules are identified.

A first type of rule might be to correct every break of that field on that transaction type. This would ordinarily be done for pieces of information that the custodian always has corrected and which have low impact on the actual transaction. For example, an external transaction identifier is provided by the custodian and is often automatically corrected. Another field that will often be automatically corrected is the settle date on a trade. While any of the possible corrections can be set to be automatically applied, more specific rules help to ensure that only the proper differences are automatically accepted.

Another type of rule could define tolerances that further control whether or not a particular difference will be accepted. Similar to the tolerances used for automatically closing breaks or for allowing the breaks to trade, a dollar- and percentage-based tolerance is one method for controlling which transactions are corrected. The user can define a dollar amount, a percentage or both a dollar amount and a percentage and if a transaction of the specified type has a break on the specified field that is within the tolerance defined, the field will be automatically corrected. For example, if the rule was as set forth in Table 7:

TABLE 7

Rule Example

| Setting Name | Value |
|---|---|
| Transaction Type | Buy |
| Field | Amount |
| Amount Tolerance | $10 |
| Percent Tolerance | Unset |

Then all buy transactions with an amount difference of less than or equal to $10 would be automatically corrected. If a percent tolerance were also defined then a transaction would have to be less than that percentage and the amount. If only a percentage were defined, the difference would have to be less than that percentage of the field that was to be changed.

Figure 3:
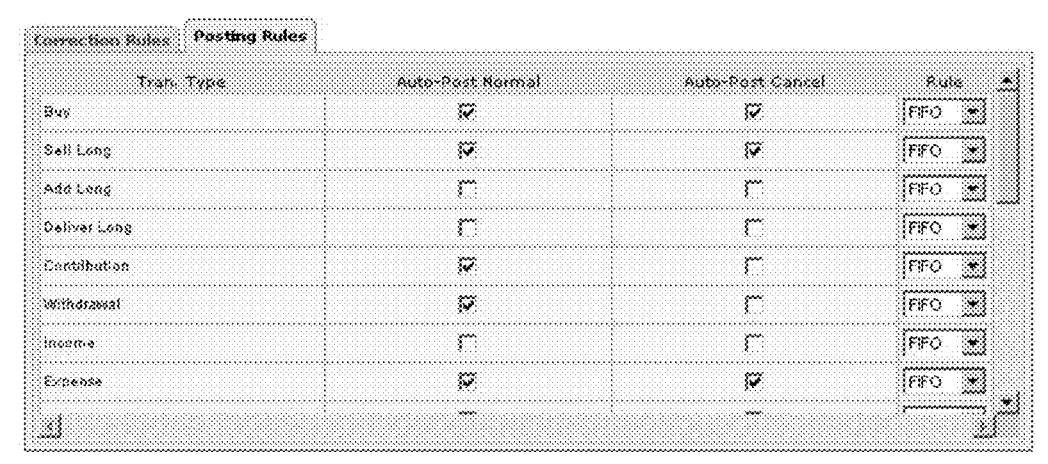

A third type of rule could be to accept the custodian's value only if the shadow value is blank, indicating that the shadow value is unknown to the shadow system. With this type of rule, the magnitude of the change does not matter, what matters is that the custodian has a value while the shadow does not. When the custodian has a value and the shadow has a value, a break is still created. Once again external identifiers are a candidate for this type of rule. If the shadow transaction has a blank external identifier, then it is safe to update the shadow transaction automatically with the custodian's external identifier; however, if the custodian and the shadow transaction have different external identifiers, this could indicate an additional problem that needs to be investigated. By using an "accept if blank" type of rule, the user will be able to identify and address this situation. In this context, "blank" can mean an empty string, a null value, a zero value, a known "empty" or "zero" date or any other logical blank value. FIG. 3 is one example of a user interface for specifying auto-correction rules.

Trade Order Matching

As previously summarized, another aspect of a system for performing reconciliation enables the matching of outstanding trade orders to unmatched transactions in the reconciliation system. During the trading process, orders for buys and sells of securities are created and sent to a trading entity to acquire or get rid of those securities. Inside the shadow system, transactions are created and stored with a pending status. These transactions are important for several reasons, including but not limited to:

Properly tracking which accounts and tax lots will be affected by the order.

In multiple style accounts, tracking which sleeves will be affected by the order.

Preventing the account from either selling the securities again, or from spending the cash on something else.

After the order has been filled, generally the custodian will send an execution indicating that the order has been filled and including the details of the transactions. In some cases, however, the execution is never sent and instead the transactions simply appear as part of the daily custodian transactions data source. This is often done because the transaction details are not known until the end of the day, and the custodian trading systems are not able to communicate the execution at that time. One example of transactions that are often done this way is mutual fund transactions.

When reconciliation is performed, the transactions appear to be unpaired custodian transactions because the transactions are only pending transactions in the shadow system. If the user were to simply accept values on or automatically post these transactions, the account would be properly updated but the order and the pending transactions associated with the order would remain in place and require manual removal. If it is expected that there will be orders for which the executions will come as transactions in the custodian reconciliation file, the user can turn on the trade order matching feature. The user can specify by investment type or other limiting factors which types of unpaired transactions should be matched to open orders.

If a particular transaction is unpaired and meets the criteria for trade order matching, the transaction is compared to the open orders to determine if it fills that order. If the transaction matches the order, the order is closed and the final values of the transaction are persisted and any pending transactions are cleaned up. Additionally, no transaction reconciliation break is created since the transaction now exists in the shadow system as it was given by the custodian.

Historical Transaction Matching and Transaction Revisions

As previously summarized, another aspect of a system for performing reconciliation enables comparison of back-dated custodian transactions. When performing transaction reconciliation, the system should compare the transactions that occurred for a certain time period. Ordinarily, the system is comparing the transactions that happened during the previous day. Periodically, there are transactions present from the custodian that happened on an older day. These transactions are often referred to as back-dated transactions. They do not occur frequently, but result in an unpaired transaction since the data loaded out of the shadow system is for the previous day.

Rather than just create a break that the user will have to investigate, this aspect of the reconciliation system communicates with the shadow system and dynamically loads the matching transaction, if it exists, from the shadow system. The reconciliation system then compares the transaction with the backdated transaction as if it were not backdated. Without the automatic loading of these types of transactions, these back-dated transactions would have to be examined manually. Mistakes made while manually comparing these transactions are avoided by automatically comparing the proper transactions.

One use case of this feature is a cancel and correct. When a custodian has sent a transaction with a mistake, the custodian often later sends a cancel transaction for the original transaction and a corrected back-dated transaction with the correct information. This is often called a "rebook" or "correct" transaction. Table 8 shows three example transactions which demonstrate this scenario:

TABLE 8

Example Transactions

| | Date Received | Trade Date | Tran Type | Quantity | Amount | Cancelled |
|---|---|---|---|---|---|---|
| A | Jan. 1, 2007 | Jan. 1, 2007 | Sell | 1000 | 1000 | No |
| B | Jan. 7, 2007 | Jan. 1, 2007 | Sell | 1000 | 1000 | Yes |
| C | Jan. 7, 2007 | Jan. 1, 2007 | Sell | 1000 | 10000 | No |

"A" is the original transaction; "B" cancels "A" and "C" rebooks "A". If transactions B and C are auto-posted, the original distribution of security can be lost. When an account holds several different lots and specific lots have been sold, for example for tax purposes, cancelling the original and then rebooking the correct transaction can cause incorrect lots to be sold. For example, if an account holds two lots, one bought at a high price and the other bought at a low price, there might be tax benefits to selling one lot or the other. If the second lot was sold originally, and then the cancel and rebook are applied it is possible that the first lot will be sold by the rebook.

Using historical transaction matching the cancel and correct can simply be turned into a revision. The matching transaction for the "rebooked" transaction is loaded into the system, and assuming that there is a matching, historical transaction regular reconciliation can be performed and regular field difference breaks can be detected properly. At this point, the cancel transaction is ignored because the original transaction is being revised with the new values.

Unsettled Transaction Management

As previously summarized, another aspect of a system for performing reconciliation enables proper matching of positions and transactions that have not yet settled.

There are several types of transactions that present challenges to reconciliation. These transactions require special handling before they are settled. Until the transactions settle the custodian does not report their cash effect in the account cash balances. Additionally, these transactions often do not report valid data for one or more fields. These conditions cause false breaks to be created that require user analysis and delay the completion of the reconciliation process.

One embodiment of this aspect of the system for performing reconciliation deals with transactions that will affect the cash balance of an account once the transaction settles. During the settlement period the custodian might not update the cash balance for certain transactions. The list of transactions that might be handled this way includes:

- When Issued Buys and Sells—A trade is when-issued when it is purchased or sold before physical security certificates have been issued.
- TBA Buys and Sells—A TBA (To Be Announced) trade is a trade of a mortgage-backed security where the actual pools that will be used are not known until the settlement date.
- Unknown Factor Buys and Sells—Trades for factored securities that are made during the period where a new factor is being determined do not settle until the factor has been announced.
- Principal Payments Due to the fact that the cash balance is not updated until the transaction settles, these transactions cause cash breaks from the time they are created until the time they settle. The cash breaks are difficult to resolve because there could be many of these transactions each starting and ending on different dates. To manually resolve the cash break, in the prior art a user must identify these transactions and track the adjustment that the transactions each make to the cash balance. The user would then manually balance the cash amount and the additional cash adjustments. This process is both time consuming and error prone. In addition to the cash breaks, transactions of this type produce transaction field breaks of various types. The amount field will often be reported by the custodian as "0" since the actual amount will not be known until the trade settles. These transaction breaks are extraneous and can be ignored by the user, but prior to the systems of the present invention the breaks would have to be manually considered and understood before being ignored.

To keep these false breaks from delaying reconciliation, this aspect of the reconciliation system identifies the transactions that have pending cash effects and tracks the specific cash effect. During transaction reconciliation the pending cash records indicate that the corresponding field breaks should be ignored. During cash balance reconciliation the pending cash records are included in the difference computation allowing the shadow value to be compared properly to the custodian value.

For example, consider an account that has $100,000 of cash. If a factored security is purchased where the factor is unknown, the custodian will indicate an estimated amount in the execution of the trade. In this example, the security costs $80,000. The shadow system will immediately deduct this money from the account so that this money will not be spent.

This aspect of the reconciliation system will detect that this transaction has a pending cash amount and track the amount of this transaction. The information to be tracked includes, but is not limited to the following: account, security, start date, end date, and amount. Depending on the type of transaction, the start and end date will be set based on the characteristics of that transaction. The amount will be either positive or negative depending on if the transaction increases or decreases the cash. A buy transaction decreases cash; hence the shadow cash will be less than the custodian cash and the amount should be positive so that the cash balance will match with the custodian's cash balance. A sell transaction increases cash; the shadow cash will be greater than the custodian cash so the pending cash amount should be negative to bring the shadow value in line with the custodian value. Table 9 outlines possible start and end date values and amount signs for the sample transaction types:

TABLE 9

Sample Transaction Start and End Calculations

| Transaction Type | Start Date Value | End Date Value | Amount Sign |
| --- | --- | --- | --- |
| When Issue Buy | Trade Date | Later of the Settle Date or the Issue Date | − |
| When Issue Sell | Trade Date | Later of the Settle Date or the Issue Date | + |
| TBA Buy | Trade Date | Settle Date | − |
| TBA Sell | Trade Date | Settle Date | + |
| Unknown Factor Buy | Trade Date | Settle Date | − |
| Unknown Factor Sell | Trade Date | Settle Date | + |
| Principal Payment | Ex Div Date | Payment Date | + |

In the current example, a pending cash record would be created for the security with an amount of $-80,000, a start date equal to the trade date, and an end date equal to the settle date. During transaction reconciliation, the custodian's transaction would have a zero amount while the shadow's transaction would have an amount of $80,000. The pending cash record would be detected and no transaction break would be created.

When reconciling the cash balances this aspect of the reconciliation system would add the pending cash record to the shadow amount before comparing the shadow amount to the custodian amount. If there were no additional cash differences, the two amounts would be the same and no cash break would be created.

Pending cash is only one embodiment of the present invention. There are other types of transactions where the recognition of the transaction does not take place until the settlement date. Some examples of these transactions might include: cash dividends, stock dividends, stock splits, spin offs and other corporate actions, reorganizations, and other transactions of this nature. In these cases, the effects of these transactions are tracked by this aspect of the reconciliation system. The effects are then considered when the transactions and positions are evaluated. If the effect offsets the difference between the custodian and shadow values, then no break is created.

By identifying, tracking, and using the pending effects during reconciliation, this aspect of the system eliminates the original detection of the breaks as well as the time to investigate and dismiss the breaks. Breaks which do not take into account pending effects can be extremely difficult to unravel due to the fact that multiple pending effects can contribute to the break. Automatically handling the pending effects makes using these more complex investment vehicles possible and ensures that the reconciliation of the accounts can be done accurately on time and on budget.

When actual breaks are detected the user must be made aware of the pending effects that were considered during the break evaluation. For example, the list of pending effects might be displayed along side the break information in the user interface so that the user is aware of their existence and values. The user is then able to reproduce the calculations that the reconciliation system has performed to find the source of the actual difference in values.

Incremental Position Reconciliation

In a further aspect of a system for performing reconciliation provides that, as transactions are being updated via reconciliation the corresponding position can be automatically reevaluated Reconciliation Undo In yet another aspect of a system for performing reconciliation, mistakes made in reconciliation can be undone. Since in various aspects of the reconciliation system very large bulk corrections can be made, a need could exist to undo them.

The logical operations of the various aspects and embodiments disclosed and claimed are implemented (1) as a sequence of computer implemented acts or program modules running on a computing device and/or (2) as interconnected machine logic circuits or circuit modules within the computing device. The implementation is a matter of choice dependent on the performance requirements of the system implementing the various embodiments. Accordingly, the logical operations making up the embodiments of the present invention described herein may be referred to variously as operations, structural devices, acts or modules. It will be recognized by one skilled in the art that these operations, structural devices, acts and modules may be implemented in software, in firmware, in special purpose digital circuit logic, and any combination thereof without deviating from the spirit and scope of the present invention as recited within the claims attached hereto.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A method for financial account reconciliation of a portfolio account system comprising:
    by a computer processor, for investments that are not reported as trades once an order to purchase has been placed, matching investments that are not reported as trades to unmatched transactions of the portfolio account system;
    by a processor, automatically detecting that the order has been fulfilled by an unmatched transaction of the portfolio account system; and
    by the processor, closing the order and automatically ignoring the unmatched transaction of the portfolio account system.

2. The method for financial account reconciliation of a portfolio account system of claim 1 further wherein the processors are selected from the group consisting of a single processor, more than one processor, and combinations thereof.

3. The method for financial account reconciliation of a portfolio account system of claim 1 further wherein an investment that is not reported as trades once an order to purchase has been placed comprises mutual funds which are priced at the end of the day.

4. The method for financial account reconciliation of a portfolio account system of claim 1 further wherein a user can specify which types of unmatched transactions of the portfolio account system should be matched to open orders.

5. A computer system for financial account reconciliation of a portfolio account system comprising:
    one or more processors;
    a database operatively associated with at least one of the one or more processors;
    a set of instructions executable by at least one of the one or more processors, to cause the at least one of the one or more processors to perform one or more operations, the set of instructions comprising:
    instructions for electronically detecting investments that are not reported as trades once an order to purchase has been placed;
    instructions for electrically matching investments that are not reported as trades to unmatched transactions of the portfolio account system;
    instructions for automatically electrically detecting that the order has been fulfilled by an unmatched transaction of the portfolio account system; and
    instructions for electrically closing the order and automatically ignoring the unmatched transaction of the portfolio account system.

6. The computer system of claim 5 wherein the processors are selected from the group consisting of a single processor, more than one processor, and combinations thereof.

7. The computer system of claim 5 wherein the set of instructions further comprises:
    instructions wherein an investment that is not reported as trades once an order to purchase has been placed comprises mutual funds which are priced at the end of the day.

8. The computer system of claim 5 wherein the set of instructions further comprises:
    Instructions wherein a user can specify which types of unmatched transactions of the portfolio account system should be matched to open orders.

9. An apparatus comprising:
    a computer readable medium having stored thereon a set of instructions executable by one or more computers to perform one or more operations, the set of instructions comprising:
    instructions for electronically detecting investments that are not reported as trades once an order to purchase has been placed;
    instructions for electrically matching investments that are not reported as trades to unmatched transactions of the portfolio account system;
    instructions for automatically electrically detecting that the order has been fulfilled by an unmatched transaction of the portfolio account system; and
    instructions for electrically closing the order and automatically ignoring the unmatched transaction of the portfolio account system.

10. The apparatus of claim 9 wherein the processors are selected from the group consisting of a single processor, more than one processor, and combinations thereof.

11. The apparatus of claim 9 wherein the set of instructions further comprises:
    instructions wherein an investment that is not reported as trades once an order to purchase has been placed comprises mutual funds which are priced at the end of the day.

12. The apparatus of claim 9 wherein the set of instructions further comprises:
    instructions wherein a user can specify which types of unmatched transactions of the portfolio account system should be matched to open orders.

* * * * *